United States Patent [19]

Ryffel

[11] 4,271,726
[45] Jun. 9, 1981

[54] PLANETARY TRANSMISSION

[75] Inventor: Henry Ryffel, Hillsboro, N.H.

[73] Assignee: Compudrive Corporation, North Billerica, Mass.

[21] Appl. No.: 974,310

[22] Filed: Dec. 29, 1978

[51] Int. Cl.³ .............................................. F16H 1/28
[52] U.S. Cl. ........................................ 74/805; 74/804
[58] Field of Search ................................... 74/805, 804

[56] References Cited

U.S. PATENT DOCUMENTS

| 3,073,184 | 1/1963 | Braren | 74/804 |
| 3,192,799 | 7/1965 | Pamplin | 74/805 |
| 3,472,097 | 10/1969 | Huska | 74/805 X |
| 3,998,112 | 12/1976 | Pierrat | 74/805 |
| 4,031,781 | 6/1977 | Iida et al. | 74/804 |
| 4,117,746 | 10/1978 | Pierrat | 74/805 |

FOREIGN PATENT DOCUMENTS

| 534761 | 1/1955 | Belgium | 74/804 |
| 542206 | 1/1932 | Fed. Rep. of Germany | 74/805 |

Primary Examiner—James Kee Chi
Attorney, Agent, or Firm—Cesari and McKenna

[57] ABSTRACT

An improved planetary transmission employs orbiting means including a first circular plate having a peripheral array of similar sockets shaped as arcs of circles. A set of similar uncaptured generally cylindrical rollers is rotatively seated in said sockets, said rollers having their curved surfaces projecting beyond the periphery of said plate. A first annular nonorbiting gear having an inner surface formed with a hypo-cycloidal curvature with a number of lobes exceeding by at least one the number of sockets in the plate, encircles the plate so that its inner surface is in rolling contact with rollers and they are free to rotate within their sockets. A second annular nonorbiting gear has surfaces in cooperating encircling engagement with said orbiting means. A first rotary shaft is keyed to one of said nonorbiting gears, and a second rotary shaft is provided to eccentrically drive said orbiting means.

12 Claims, 6 Drawing Figures

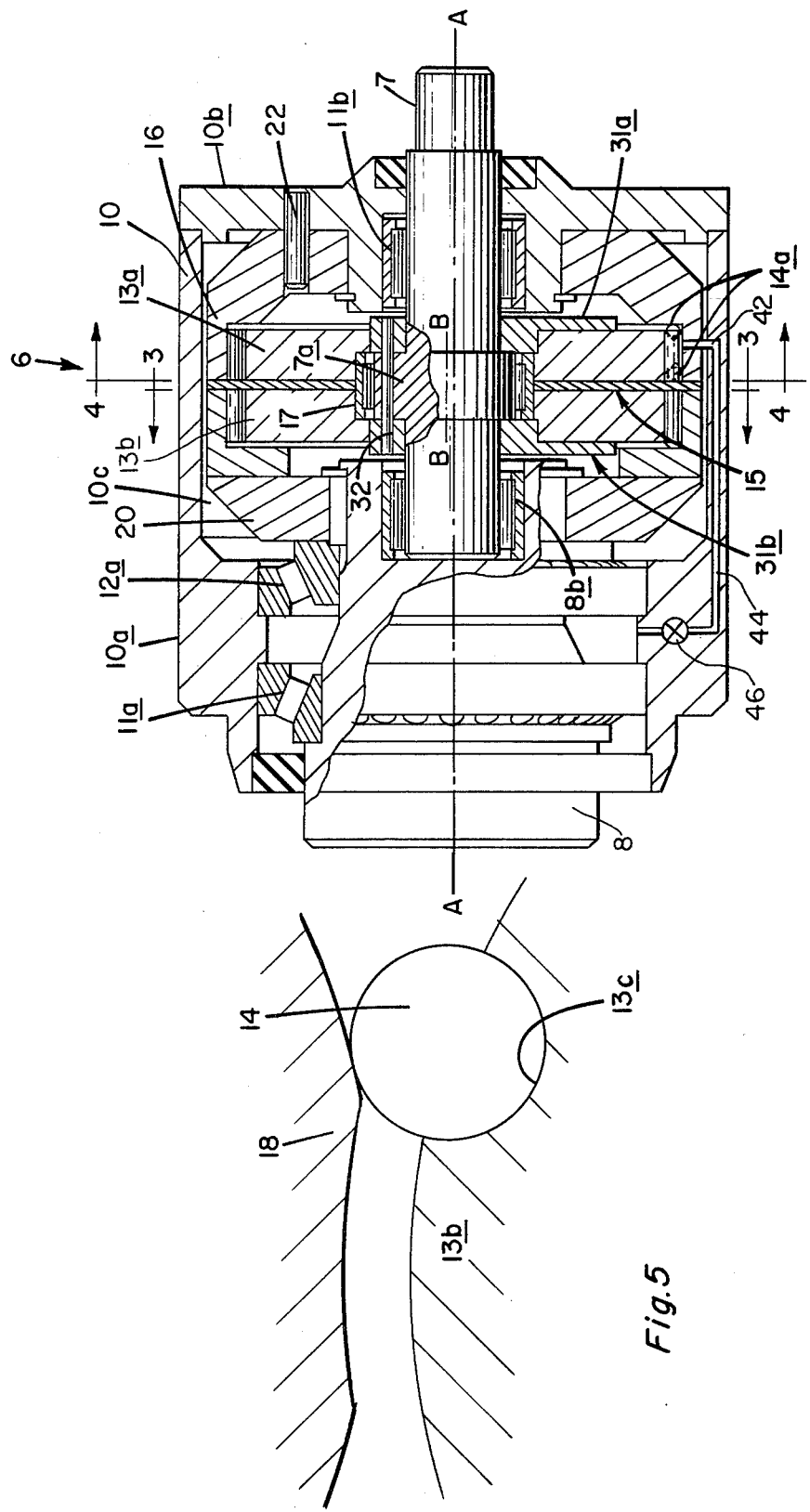

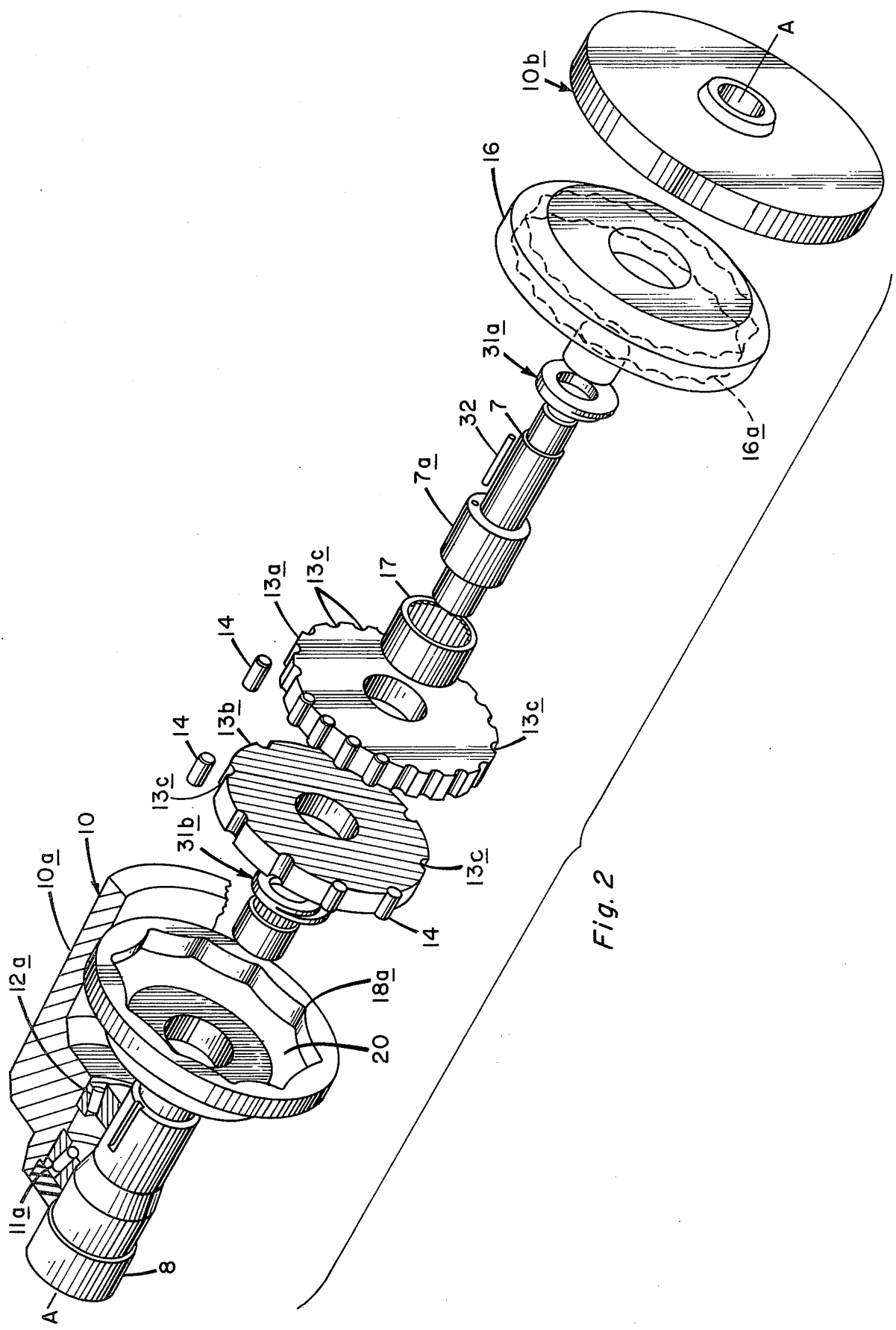

PLANETARY TRANSMISSION

BACKGROUND OF THE INVENTION

This invention relates to a planetary transmission. It relates more particularly to a transmission of this type which is particularly efficient and relatively easy and inexpensive to manufacture in quantity.

Planetary transmissions are, of course, quite old. They are used to promote transmission of power while involving relatively small bulk and but a few parts which desirably move at relatively slow speeds. The gearing preferred for such purposes comprises paired orbiting and nonorbiting gears in which substantially continuous rolling contacts occur between many gear teeth which are simultaneously in torque-transmitting engagements. Examples of such transmissions are disclosed in the following patents:
U.S. Pat. No. Re. 24,288 Nanni,
U.S. Pat. No. 3,056,315 Mros,
U.S. Pat. No. 3,073,184 Braren,
U.S. Pat. No. 3,192,799 Pamplin,
U.S. Pat. No. 3,985,047 Therkelsen,
U.S. Pat. No. 3,998,112 Pierrat,
U.S. Pat. No. 4,023,440 Kennington,
U.S. Pat. No. 542,206 Fed. Rep. of Germany.
Of particular relevance for purposes of this invention are U.S. Pat. Nos. 3,998,112 and 4,117,746 which are owned by the assignee of the present application.

The prior transmissions of this general type employ internal orbiting gears having teeth or lobes of epitrochoidal curvature which cooperate with a surrounding external nonorbiting gear whose teeth are in the form of cylindrical pins or rollers and exceed by one the number of teeth in the internal orbiting gear. In those transmissions, there are at least two orbiting and nonorbiting gear pairs. Also the oribiting gears are interchangeable and have the same diameter and mass eccentricities so that they remain matched with counterweighting despite their different numbers of teeth. The cooperating nonorbiting gears are likewise all of the same diameter and have their teeth conveniently disposed at one predetermined radial distance from a central axis.

Prior transmissions of that general type are disadvantaged in that they are relatively expensive to manufacture. The main reasons for this are that the internal orbiting gears have to be machined from strong metal stock such as tool steel because of the very high Hertzian stresses on the peripheries of the externally lobed orbiting gears. Also close tolerances must be maintained between a central shaft-receiving bore or barrel in each orbiting gear and the peripheral gear teeth or lobes which because of the relatively small radii of curvature of the lobe surfaces of the oribiting gears, are relatively steeply pitched and therefore difficult to machine with the required accuracy.

Further, since the nonorbiting gears in the prior transmissions have teeth in the forms of fixed circular arrays of pins spaced radially outward from the gear axes, maintenance of sufficiently high tolerances between those pins and the bore or barrel through the orbiting gears are equally hard to maintain. The result is that the prior transmissions have a tolerance stack-up problem which renders their output motions not as smooth as might be desired. This is particularly so in the case of transmissions subjected to a heavy load which tends to deflect the orbiting gears to the opposite sides of the transmission housing to the extent that their "nondriving" lobes actually interfere with pins on the opposite sides of the nonorbiting gears.

In addition, the radii of curvature of the lobe surfaces of the orbiting gears in the prior drives of this type are relatively small. Therefore, their Hertzian load carrying capacities and hence their torque load capacities are not as high as might be desired. Also the prior transmissions employing pins as the nonorbiting gear teeth are not as efficient as might be claimed or wished. This is because the pins, being rotatable but peripherally restrained in their sockets, are insufficiently lubricated so that a considerable amount of sliding friction exists between the orbiting and nonorbiting gears. Of course, this also promotes excessive parts wear and subsequently, increases in roughness of operation, and noise, a reduced operating life, and a deterioration in efficiency.

SUMMARY OF THE INVENTION

Accordingly, the present invention aims to provide a planetary transmission whose cost is less than prior comparable transmissions of this general type.

Another object of the invention is to provide a planetary transmission which has a relatively smooth output motion.

Yet another object of the invention is to provide a transmission of this type whose parts do not suffer an excessive amount of wear in use.

A further object of the invention is to provide a planetary transmission which can operate uninterruptedly for a prolonged period.

A further object of the invention is to provide a transmission of this general type which is a relatively efficient torque transmitter.

Another object of the invention is to provide a planetary transmission which has a higher load capacity than prior comparable planetary devices of this type.

Another object of the invention is to provide modifications in the lobe surfaces of planetary gearing which will attenuate the efficiency-diminishing aspects of deflections under load which are not incorporated into or considered in other similar drives.

A further object is to provide apparatus of this kind which is relatively easy and inexpensive to maintain.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the subject planetary transmission comprises a separable generally cylindrical housing in which two in-line rotatable first and second shafts are journaled. The first shaft is provided with an eccentric shoulder for its support of an orbital circular plate of predetermined diameter. About the circular periphery of the plate are formed a plurality of open sockets, each preferably in the form of an arc having the general shape of a circular segment. Seated in these sockets is a circular array of generally cylindrical pins or rollers with the peripheral surface of each pin rotatively engaging the circular wall of each socket.

The plate and its circumferential array of pins is in cooperative engagement with a first nonorbiting annular gear having an inner wall or surface which follows a substantially continuous hypo-cycloidal curvature, which curvature is modified by cropping the crests of the lobes of that gear so that the crests are arcs of a single circle whose center coincides with the axis of the gear. That first gear is fixed with the housing coaxially with the central axis of the first shaft.

Also mounted on the same eccentric shoulder on the first shaft is a second orbital plate coupled for rotation with the first plate about a common eccentric axis and preferably being integral with and of substantially the same diameter as the first plate. The second plate also has a peripheral array of arcuate sockets which receive a set of cylindrical pins.

Encircling the second plate and pins thereon and in cooperative engagement with those pins is a second nonorbiting annular gear whose inner edge or surface is formed with a substantially continuous hypo-cycloidal curvature also modified as described above. A second shaft is keyed to the second nonorbiting gear with the shaft and the second gears being rotatable within the housing about an axis collinear with the first shaft axis.

Preferably counterweights offsetting the rotational imbalances of the eccentrically-disposed orbiting plates and pins are locked with the first shaft and serves collectively not only for those plates but also for substitute plates of similar dimensions but with differing numbers of sockets and pins.

As is usual in planetary transmissions of this general type, the number of pins on each orbiting plate is at least one less than the number of lobes or teeth on the corresponding nonorbiting gear which cooperates with those pins.

Also as is known, differential actions may be developed in the transmission by rotating one of the two shafts relative to the housing or vice versa, the output torque being taken from the other shaft. Also of course, one shaft can be rotated relative to the other, the output torque being taken from the housing.

Since the orbiting elements of the present transmission, unlike those in prior drives of this type, are plates whose socket walls provide large area engagement of the pins in their peripheral arrays, the stresses on those orbiting members are relatively low. Consequently, the plates do not have to be particularly strong or hardened steel. Rather they can be molded or otherwise fabricated from nylon or other comparable inexpensive plastic material or relatively soft, inexpensive metals. Moreover, since the pins are rotatively captured in their sockets by contact with lobes of the mating gear, critical tolerances do not have to be maintained between the peripheries and the barrels of the orbiting members. Consequently, tooling costs for the subject transmission are considerably reduced.

Also as the orbiting plates rotate, centrifugal forces are developed which cause the pins to leave their seats to some extent and revolve within their sockets so that new lubricant enters the space created and all surfaces of the pins remain coated with lubricant present in the housing. This not only reduces parts wear and increases transmission efficiency, but also the thin film of lubricant between each pin and its socket wall acts as a buffer or squeeze film shock absorber which compensates for the lower parts tolerances noted above. Resultantly, the output motion of the transmission is smoother than those of prior comparable drives of this general type. Preferably too, the depth of the sockets in the two orbiting plates should be somewhat less than the radius of the pins seated in those sockets so that the pins do not tend to become bound up in their sockets when the transmission is operative.

The cost of manufacturing the outer nonorbiting gears in the present transmission is also minimized because those gear surfaces are located at relatively long radial distances from the axis of the transmission so that their curvatures are more gentle. Thus they are easier to machine. Also no dimensionally critical relationships have to be maintained between those curved surfaces and any centrally located bore or barrel. Still further, being located at greater distances from the transmission axis, the nonorbiting gears are additionally advantaged in that they enable the transmission to have a higher load capacity and therefore increased output power.

Additionally, the employment of a tip-modified hypo-cycloidal curvature on the nonorbiting gears prevents interference between nondriving pins on the orbiting plates and the lobes of the nonorbiting gears thereby increasing the efficiency of the drive and ensuring a smooth output motion.

In a preferred embodiment of my transmission, one or more small radial passages may be formed in the nonrotating nonorbiting gear at the bottom dead center position of its cooperating orbiting gear. Appropriate conduits connected to those passages lead to the various shaft bearings in the transmission. When the transmission is operative, lubricant trapped between the orbital plate with its pins and the cooperating nonrotating nonorbiting gear is confined into an ever smaller volume until the orbiting member reaches its bottom dead center position. Whereupon, the lubricant is expelled through the passages to the remote bearings in the transmission in order to lubricate those bearings. Consequently, those shaft bearings do not suffer excessive wear and operate efficiently even though the transmission is run for a prolonged period.

As a result of the aforesaid features, the present transmission can be manufactured and assembled at a lower cost than the prior comparable transmissions of this general type. Still however, the apparatus can operate efficiently and reliably for a prolonged period. Therefore, it should have a wide variety of industrial and commercial applications.

BRIEF DESCRIPTION OF THE DRAWINGS

For a fuller understanding of the nature and objects of the invention, reference should be had to the following detailed description taken in connection with the accompanying drawings, in which:

FIG. 1 is a transverse cross-sectional view of a planetary transmission embodying the principles of this invention;

FIG. 2 is an exploded perspective view with parts cut away on a somewhat smaller scale showing the various components of the transmission in greater detail;

FIG. 5 is a fragmentary elevational view on a larger scale showing a portion of the FIG. 1 apparatus in greater detail.

DESCRIPTION OF THE PREFERRED EMBODIMENT

Figure 4:
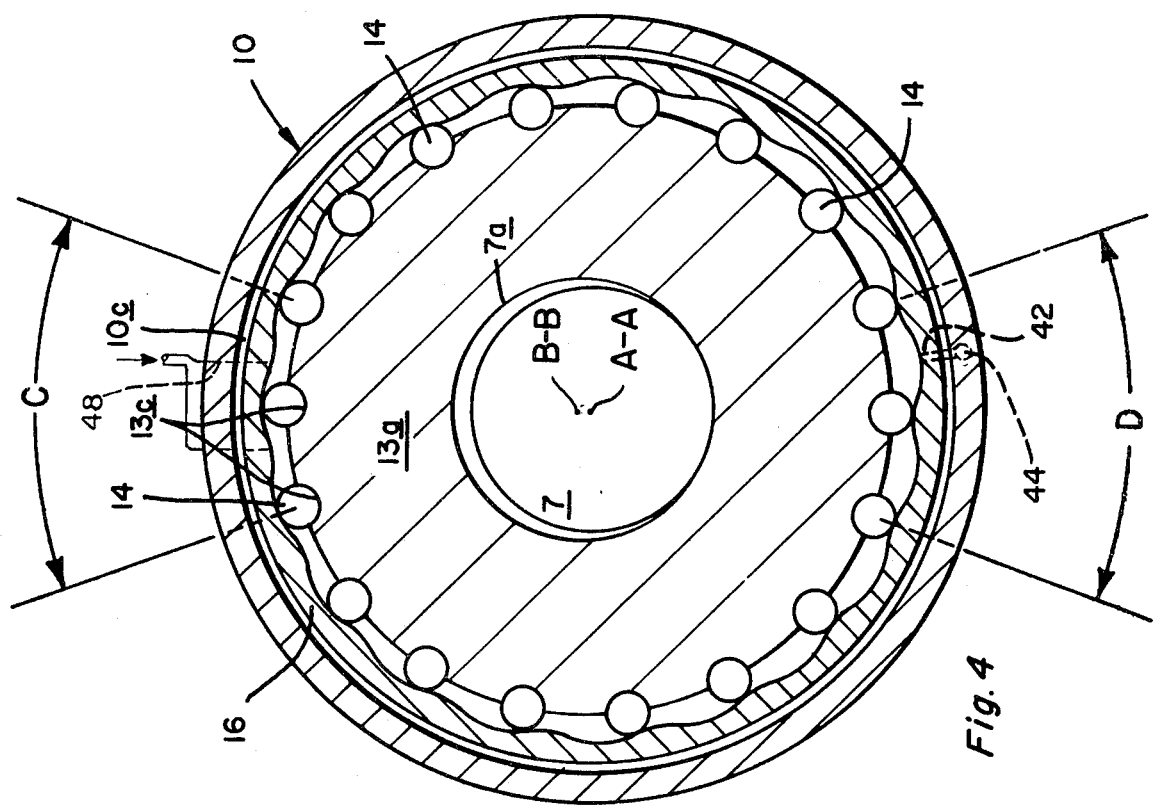
FIG. 4 is a similar view along line 4—4 of FIG. 1.

Turning now to FIGS. 1 and 2 of the drawings, my transmission indicated generally at 6 comprises first and second shafts 7 and 8 respectively rotatively supported collinearly within a housing 10. Housing 10 comprises separable housing parts 10a and 10b which are normally held together by suitable fasteners (not shown). Included are bearing supports 11a and 12a for shaft 8 and a bearing support 11b for shaft 7. A second bearing support 8b for the inner end of shaft 7 is disposed within the inner end of shaft 8.

Within the cavity 10c defined within the joined-together housing parts 10a and 10b are a pair of orbiting elements 13a and 13b which are preferably integral with one another but which are shown in spaced relation in FIG. 2. Orbiting elements 13a and 13b are substantially circular plates, but they are interrupted by peripheral recesses or sockets 13c of substantially circular-segment form. Each socket 13c rotatively a generally cylindrical pin or roller 14. Preferably an annular spacer 15 (FIG. 1) is included between the two elements 13a and 13b to separate the two sets of pins 14 and provide bottoming surfaces for those pins. Also the ends of the pins can be conically recessed and fitted with balls 14a (FIG. 1) which act as side thrust absorbers. Such modified pins may be desirable in those applications which require such thrust absorption at low cost.

Thus orbiting element 13b with its peripheral array of pins functions more or less like a gear having a number of cylindrical teeth in the form of pins or sleeves 14 disposed for cooperative meshed engagement with an annular internal nonorbiting gear 18 nonrotatably keyed or otherwise fastened to shaft 8. Likewise the orbiting element 13a with its circumferential array of cylindrical pins 14 is disposed for cooperative meshed engagement with a second annular internal nonorbiting gear 16. Gear 16 is nonrotatably secured to housing 10b by pins 22 or other means.

In accordance with known practice, the orbiting element 13a is designed to have at least one less pin 14 than there are a predetermined maximum number of lobes 16a on its cooperating nonorbiting gear 16. Likewise the element 13b has one less pin than there are lobes 18a nonorbiting element 18.

The centers of the nonorbiting gears 16 and 18 coincide with the transmission axis A—A, whereas the centers of both of the orbiting elements 13a and 13b lie along an axis B—B which is eccentric in relation to axis A—A by an amount which is appropriate for the desired condition of rolling contact to appear between the pins 14 and the nonorbiting gears 16 and 18. This eccentricity is established by an eccentric circular cam shoulder 7a integral with shaft 7. the orbiting elements 13a and 13b are mounted on the shoulder 7a with a common eccentricity via a bearing 17 which permits their angular motion relative to that cam shoulder. The gear 16 is angularly keyed to the housing by a locking pin 22 (FIG. 1) secured with it and with the housing part 10b.

In order to offset the effects of eccentricities in the orbiting elements, a pair of counterweight halfs 31a and 31b (FIGS. 1 and 2) are fastened together and with shaft 7 by way of a pin 32 extending through eccentric shoulder 7a with its opposite ends projecting into the counterweights.

As shaft 7 is rotated from outside the housing 10, its eccentric cam shoulder 7a causes the surrounding orbiting element 13a to orbit within the nonorbiting gear 16 fixed with the housing. Inasmuch as the orbiting element 13a has one less effective "tooth" than nonorbiting gear 16, the former is forced to turn angularly about its eccentric axis B—B by an amount equal to the angular spacing between its adjacent teeth each time shaft 7 completes one full turn. That angular motion of the orbiting element 13a is in an angular direction opposite to that of the shaft 7 rotation.

At the same time, the second orbiting element 13b which is angularly locked with element 13a must necessarily describe an orbital path of motion angularly with element 13a in that same opposite direction and by the same amount about the same axis B—B of eccentric shoulder 7a. That orbital movement of the second element 13b takes place within the mating teeth of the second nonorbiting element 18 and the latter which has one more tooth than element 13b is concommitantly forced to move angularly about the transmission axis A—A by way of its bearing support with shaft 8 to which it is keyed via plate 20. Thus speed reduced power output is available via that shaft 8. In this sense, then, my transmission operates in the fashion of the one described in U.S. Pat. No. 4,117,746 owned by the assignee of the present application in that it yields speed changes dictated by the relationship $$\frac{N_1 (N_2 + 1)}{N_1 - N_2}$$

where $N_1$ is the number of pins on the first orbiting element 13a and $N_2$ is the number of pins on the second orbiting element 13b.

If the number of lobes on the nonorbiting gear 18 is smaller than the number of lobes on the nonorbiting gear 16, then the rotations of the two shafts 7 and 8 are in the same direction. On the other hand, the rotation of shaft 8 relative to shaft 7 is reversed if the number of lobes on the gear 18 is greater than the number of lobes on the gear 16.

Of course, the torque input could just as well be applied to shaft 8, and the output taken from shaft 7. Also, the apparatus can function as a differential. That is, a torque input applied to shaft 7 will produce a reduced speed output at shaft 8 whose value depends upon the relative rotation of shaft 7 and the housing. By the same token, if housing 10 is rotated by an external source, shaft 8 will rotate at a lesser speed dependent upon the rotation of shaft 7 relative to the housing as described for example in application Ser. No. 752,478, filed Dec. 20, 1976 entitled DIFFERENTIAL-TYPE DRIVES FOR CENTRIFUGES AND THE LIKE (now abandoned). However, the present transmission has several advantages over those prior drives in terms of low manufacturing cost, efficiency, output smoothness and torque handling capability and durability.

Figure 3:
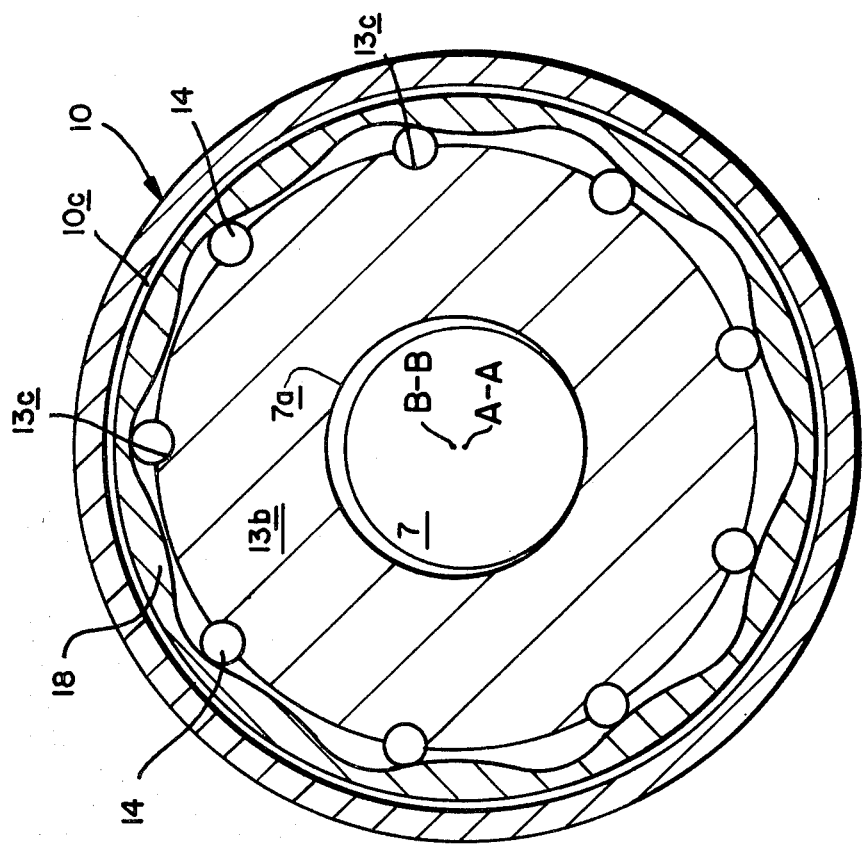
FIG. 3 is a sectional view along line 3—3 of FIG. 1.

More particularly, the orbiting elements 13a and 13b of the present apparatus, instead of being critically dimensioned gear parts whose peripheral lobes have to be precisely dimensioned relative to an axially located barrel or bore, are simply circular plates having peripheral arrays of circular segment sockets. As best seen in FIGS. 3 to 5, the depth of each socket is desirably but not necessarily less than the radius of a pin 14 so that the pins do not tend to become bound up in their sockets when the transmission is operative. Also, the plates are arranged so that their rims just clear the peaks of the lobes on the nonorbiting gears encircling the plates. Furthermore, the orbiting elements 13a and 13b can be molded parts made of nylon or other plastic instead of being expensive machined metal parts because they no longer have to be particularly strong in some applications. This stems from the fact that the pins 14 make relatively wide-area contact with the walls of their sockets so that the forces exerted by the pins on those elements is distributed over large areas with the result that the stresses on the elements are kept to a minimum.

The nonorbiting elements with their inside lobes or teeth, even though they are machined of metal, are still easier to make than the prior externally lobed gears because their scalloped surfaces, being located on larger radii, have more gentle slopes of a hypo-cycloidal curvature.

Actually the lobed elements can be made of economically powdered metal because they are internal gears having relatively large radii. Therefore the required compacting tools are external members which are less costly and more accurately manufactured than internal tool members.

Figure 6:
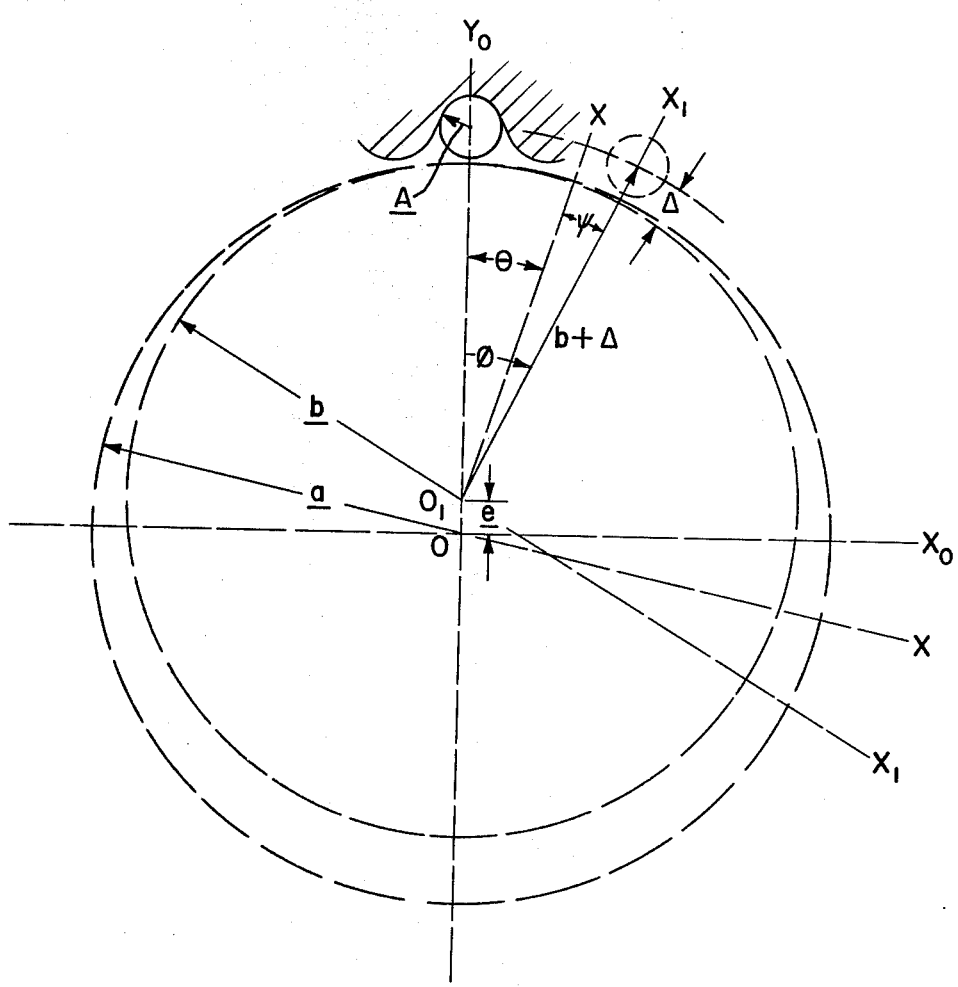
FIG. 6 is a diagrammatic view illustrating the operation of the transmission.

For a constant velocity ratio of a meshing internal gear set of the general type with which we are concerned here:

$$a\theta = b\phi \qquad (1)$$
$$a - b = e$$

where referring to FIG. 6:
 a = pitch radius of internal gear
 b = pitch radius of orbiting gear
 e = eccentricity
 A = radius of roller 14
 Δ = selected displacement of roller 14 circle center from pitch point.

For meshing gear sets such as these, Δ should be positive if undercutting upon removal of interfering but desirable material from the lobes during formation of the gear are to be avoided.

In this case, the coordinates of a point of contact between a pin and a cooperating lobe on the internal gear, referred to the $X_1O_1Y_1$ coordinate system, depicted in FIG. 6, fixed to and rotating with the orbiting element are as follows:

$$X_1 = b + \Delta + A\left(\frac{\cos^2\phi + Q_1}{1 + Q_1}\right)^{\frac{1}{2}} \qquad (2)$$

$$Y_1 = \frac{A\sin\phi}{(1 + Q_1)^{\frac{1}{2}}}$$

where:
$Q_1 = 1 + 2R_1 + R_1^2 - 2(1 + R_1)\cos\phi$
$R_1 = \frac{\Delta}{b}$

The points of contact on the pin 14 given by Equations (2) may be transformed to become points defining the shape of the lobes on the internal gear using the following transformation equations:

$$X = 3\cos\theta + X_1\cos\psi - Y_1\sin\psi \qquad (3)$$
$$Y = -e\sin\theta + X_1\sin4 + Y_1\cos\psi$$

where:
$\theta = \frac{b}{a}\phi$
$\psi = \phi - \theta = \frac{e\phi}{a}$ the points X, Y being points in the XOY coordinate system fixed to the internally toothed gear.

The coordinates for a complete lobe on the internal gear are obtained by using equations (2) and (3) and using all values of $\phi$ from 0° to 360° inclusive. To obtain *all* the coordinates for the complete continuous curve of the internal gear profile, $\phi = 0°$ to $360° \times N$ should be used, where N = number of lobes on the internal gear, = a/e. Such continuous lobed surfaces may be made by the apparatus described in U.S. Pat. No. 4,052,928 modified by adding an additional idler gear in the table drive mechanism.

There the use of internally tooth gears cooperating with orbiting pin-carrying elements gives rise to lower working stresses on the roller-gear surface interfaces than are present in the prior apparatus in that the Hertzian stresses for equal size configurations are lower.

Actually each gear surface is a tip modified hypocycloid curve in that the peaks of the lobes are cropped along arcs of a single circle whose center coincides with the gear axis A—A. (The amount of material removed can be fairly large or any other amount so long as that amount does not remove that portion of the peaks of the lobes exhibiting the most favorable pressure angle for power transmission. A crop of 0.003 inch has proven satisfactory.) This improves the efficiency of the apparatus and smoothens its output motion particularly under high loads when there is a tendency for the orbiting elements to be urged to the opposite side of the housing where their pins might otherwise tend to interfere with the peaks of the nonorbiting gear lobes.

The utilization in the present transmission of loose pins 14 instead of captured ones as in prior patented drives of this general type also increases the efficiency and load capacity of the apparatus considerably and further smoothens its output motion. This is because the pins 14 are free to rotate in their sockets. Indeed, as the orbiting elements 13a and 13b rotate, the rollers are subjected to centrifugal forces which unseat the rollers somewhat from their sockets so that lubricant is drawn in underneath the rollers. Resultantly, the rollers are kept lubricated and so-called squeeze films of lubricant are maintained between the rollers and their sockets which function as shock absorbers and tend to smoothen the output motion of the transmission and obviate the need to maintain close tolerances from the teeth of the nonorbiting gears through the pins all the way into the barrel of the orbiting elements. Actually, if hollow sleeves instead of pins are used on the orbiting elements, even lower tolerances can be maintained. This is because the sleeves will actually deform under load and conform to their sockets to achieve efficient rolling contact with the internal gear surfaces so long as the squeeze film is maintained between the sleeves and sockets. The utilization of sleeves instead of pins also permits lubricant to fill the spaces inside the sleeves during operation of the transmission. Since sound absorption is a function of surface area, that lubricant can provide significant noise attenuation in those applications where such attenuation is desirable.

For maximum smoothness and efficiency particularly when high loads are involved and deflections of parts occur, the above mathematically defined shape of the gear surface should be further modified by "thinning" the lobes to provide the equivalent of backlash in the more common involute form of gear mesh. This ensures that the nondriving pins (i.e., the 50% of the pins on the back sides of the lobes) do not unduly frictionally contact those lobes and cause excessive firctional losses and in extreme cases of deflection, contribute a negative or retarding "driving" force.

Preferably, the lubricant used in the present transmission should be of the tractive type which, when maintained under pressure, has a high coefficient of traction. A suitable lubricant of this type is sold by Monsanto Chemical Co. under the tradename Santotrac. This elastohydrodynamic lubricant has a greater tendency than conventional ones to remain as an effective film or coating on the pins and gear surfaces, especially when those surfaces are actually performing a driving function so that they are subjected to high stress.

Also I have found that such tractive lubricants and a rolling tooth type mechanical drive such as the present one coact to provide an increase in efficiency and load capacity as compared with drives lubricated conventionally. This is not due simply to the obvious and known tractive qualities of the lubricant, but rather because of heretofore unrecognized kinematic or dynamic relationships between the roller sockets, the rollers and the lobular gear surfaces. More particularly, I have found that the pins 14 should roll freely in their sockets which the tractive lubricant allows at least as well as conventional oils. Also the pins should be driven in their sockets without any accompanying slippage between the pins and mating lobed surfaces. I have found that such tractive fluids in such high stress (Hertzian) contact areas inhibit such slippage and thereby greatly increase the allowable Hertz stress at those areas without surface damage. Resultantly both the life of the contacting surfaces and the load capacity of the transmission are increased. Finally, in the presence of such viscoelastic lubricants, the bearings under the orbiting elements, e.g. bearing 17, experience a life increase of between two and five times the normal life expectancy.

Finally planetary and differential drives such as the present one having relatively large amounts of circulating power within the mechanism are characterized by a lower efficiency than conventional gearing at the lower range of their torque/efficiency spectra. Moreover the lubricant film thickness is less at low speeds. The lubricating of those transmissions with tractive type greases has been found to produce a marked increase in the efficiency at that lower range. Further that lubricant develops film thickness immediately upon rotation of the part on which it is applied so that the transmission parts are properly coated even at low speeds.

Actually the relative rotation between an orbiting element and its nonorbiting gear may be used to circulate lubricant to the various shaft bearings within housing 10. More particularly and referring to FIG. 4, one or more passages may be formed in nonrotating element 16 as shown at 42 in FIG. 4 at the bottom dead center position of its mating orbiting element. Passage 42 connects to a tube 44 leading the remote bearings, say, bearings 11a and 12a. As element 13a rotates, the space or volume enclosed by adjacent pins 14 on the orbiting element and the trough between lobes on the outer nonorbiting gear 16 becomes progressively smaller as the orbiting element moves from its top dead center position toward its bottom dead center position shown in dotted lines at 13a' in FIG. 4. Accordingly the lubricant in that space is forced through passage 42 and tube 44 to the space between the bearings 11a and 12a. If desired, a small ball check valve 46 (FIG. 1) may be provided in passage 42 or tube 44 to provide one way fluid flow through the passage. Thus the transmission functions as a pump to circulate lubricant within the housing. Consequently, the apparatus can operate uninterruptedly for a prolonged period without requiring maintenance and without suffering undue parts wear.

Actually, the present drive can be used as a fluid pump with proper placement of suitable side ports. More particularly and referring to FIG. 4, an intake port 48 may be formed in gear 16 extending around the sector C in that figure. Likewise an arcuate exhaust port similar to port 42 can be provided in gear 16 spanning sector D in FIG. 4. Fluid drawn in over sector C will be confined to an ever smaller space as the orbiting member 13a rotates and will be expelled at sector D. The mechanical and volumetric efficiency of such a pump should exceed those of the well known Geroter pumps.

It can be seen from the foregoing, then, that my improved transmission provides significant advantages over prior similar apparatus typified by the drives disclosed in the aforesaid U.S. patents in terms of increased efficiency and torque handling capability and durability. Yet it should cost much less to manufacture than those prior drives for the reasons stated above.

It will also be seen that the objects set forth above, among those made apparent from the preceding description, are efficiently attained. Also since certain changes may be made in the above constructions without departing from the scope of the invention. For example, while we have disclosed a two stage transmission, it is obvious that the same principles may be applied to a single stage drive. Therefore, it is intended that all matter contained in the above description or shown in the accompanying drawings shall be interpreted as illustrative and not in a limiting sense.

It is also to be understood that the following claims are intended to cover all of the generic and specific features of the invention herein described.

I claim:

1. An improved planetary transmission comprising
   A. a housing,
   B. orbiting means including a first circular plate having a peripheral array of similar sockets shaped as arcs of circles,
   C. a set of similar uncaptured generally cylindrical rollers rotatively seated in said sockets, said rollers having their curved surfaces projecting beyond the periphery of said plate,
   D. a first annular nonorbiting gear, said first gear having an inner surface formed with a hypo-cycloidal curvature with a number of lobes exceeding by at least one the number of sockets in said plate, said first gear encircling said plate so that its said inner surface is in rolling contact with said rollers and said rollers are free to rotate within their sockets,
   E. a second annular nonorbiting gear, said second gear having surfaces in cooperating encircling engagement with said orbiting means,
   F. a first shaft keyed to one of said nonorbiting gears, said first shaft being rotatively secured in and projecting from said housing, and
   G. means including a second shaft rotatively secured in and projecting from said housing for eccentrically driving said orbiting means within said housing.

2. The transmission defined in claim 1 wherein
   A. said orbiting means includes a second peripheral array of sockets in the form of arcs of circles and a second set of uncaptured rollers rotatively seated in said second set of sockets, said rollers having curved surfaces projecting beyond the periphery of said orbiting means, and
   B. said second nonorbiting gear also has an inner surface formed with a hypo-cycloidal curvature with a number of lobes exceeding by at least one the number of sockets in said second set of sockets in said orbiting means, said annular surface encircling said orbiting means with its inner surface in rolling contact with said second set of rollers while said rollers are free to rotate within their sockets.

3. The transmission defined in claim 1 wherein the surface of hypo-cycloidal curvature of said first nonorbiting gear is modified by cropping the peaks of its lobes along arcs of a single circle whose axis corresponds to the axis of said first nonorbiting gear.

4. The transmission defined in claim 1 wherein the surface of hypo-cycloidal curvature of said first nonorbiting gear is modified by thinning its lobes to provide backlash.

5. The transmission defined in claim 1 wherein said rollers have recessed ends and further including bearing balls rotatively seated in said recessed ends whereby to function as side thrust absorbers during operation of the transmission.

6. The transmission defined in claim 1 wherein said rollers comprise hollow sleeves and further including fluid lubricant filling said sleeves whereby to provide noise attenuation during the operation of the transmission.

7. The transmission defined in claim 1 and further including a fluid lubricant in said housing, said lubricant existing as squeeze films between said rotating rollers and their sockets during operation of the transmission.

8. The transmission defined in claim 7 wherein said lubricant is a tractive type lubricant whereby said rollers are rotated freely within their sockets without accompanying slippage between said rollers and the inner surface of said nonorbiting gear.

9. The transmission defined in claim 1 wherein the depth of said sockets is less than the radius of said rollers.

10. The transmission defined in claim 1 and further including a passage in said nonorbiting gear, said passage having one end located in the valley between adjacent lobes of said nonorbiting gear and means leading from the other end of said passage to a selected lubrication site within said housing whereby during operation of the transmission the bottoming of said rollers in said valley circulates lubrication through said passage to said lubrication site.

11. The transmission defined in claim 10 and further including means for checking reverse flow through said passage.

12. The transmission defined in claim 1 and further including means defining a fluid intake passage in said nonorbiting gear encompassing a first selected sector of said nonorbiting gear and means defining an exhaust passage in said nonorbiting gear, said exhaust passage encompassing a second selected sector of said nonorbiting gear, said second sector being disposed substantially opposite said first sector whereby as said orbiting means orbits it creates a negative pressure at said intake passage and a positive pressure at said exhaust passage.

* * * * *

UNITED STATES PATENT AND TRADEMARK OFFICE
CERTIFICATE OF CORRECTION

PATENT NO. : 4,271,726
DATED : June 9, 1981
INVENTOR(S) : Henry Ryffel

It is certified that error appears in the above-identified patent and that said Letters Patent are hereby corrected as shown below:

Column 5, line 13, after "rotatively" insert --receives--.
Column 5, line 39, after "18a" insert --on--.
Column 5, line 48, delete "the" and insert --The--.
Column 7, line 54, delete "3cos" and insert --ecos--.
Column 8, line 1, delete "= a/e " and insert -- $= \frac{a}{e}$ --.
Column 8, line 63, delete "firctional" and insert --frictional--.
Column 9, line 46, delete "FIG. 4" and insert --FIGS. 1 and 4--.
Column 9, line 50, after "leading" insert --to--.
Column 10, line 19, delete "since".

Signed and Sealed this

Twenty-third Day of March 1982

[SEAL]

Attest:

GERALD J. MOSSINGHOFF

*Attesting Officer*     *Commissioner of Patents and Trademarks*